(12) United States Patent
Johannes et al.

(10) Patent No.: US 9,102,088 B2
(45) Date of Patent: Aug. 11, 2015

(54) MOLDED INSULATOR

(71) Applicant: Sabritec, Irvine, CA (US)

(72) Inventors: Richard Johannes, Coto De Caza, CA (US); Christopher W. Nesselroad, Dana Point, CA (US); John Kooiman, Mission Viejo, CA (US)

(73) Assignee: Sabritec, Costa Mesa, CA (US)

( * ) Notice: Subject to any disclaimer, the term of this patent is extended or adjusted under 35 U.S.C. 154(b) by 83 days.

(21) Appl. No.: 13/971,804

(22) Filed: Aug. 20, 2013

(65) Prior Publication Data

US 2015/0056873 A1    Feb. 26, 2015

(51) Int. Cl.
| | |
|---|---|
| H01R 13/64 | (2006.01) |
| B29C 45/40 | (2006.01) |
| B29K 101/00 | (2006.01) |
| B29L 31/36 | (2006.01) |
| H01R 13/6477 | (2011.01) |

(52) U.S. Cl.
CPC ............ B29C 45/40 (2013.01); *B29K 2101/00* (2013.01); *B29L 2031/36* (2013.01); *H01R 13/6477* (2013.01)

(58) Field of Classification Search
CPC .......... H01R 13/6477; H01R 13/6473; H01R 13/6474; H01R 13/6476
See application file for complete search history.

(56) References Cited

U.S. PATENT DOCUMENTS

| | | | |
|---|---|---|---|
| 5,179,366 A | 1/1993 | Wagner | |
| 6,749,454 B2 * | 6/2004 | Schmidt et al. | 439/350 |
| 8,257,103 B2 * | 9/2012 | Costa et al. | 439/271 |
| 2010/0328021 A1 | 12/2010 | Hirasawa et al. | |
| 2011/0156860 A1 | 6/2011 | Smith et al. | |

FOREIGN PATENT DOCUMENTS

| | | |
|---|---|---|
| JP | 08-222401 A | 8/1996 |
| KR | 10-2011-0073765 | 6/2011 |

* cited by examiner

*Primary Examiner* — Ross Gushi
(74) *Attorney, Agent, or Firm* — Snell & Wilmer LLP (57) ABSTRACT

A molded insulated connector for a Quadrax cable. The connector includes an outer tube and four inner tubes housed within the outer tube. Each inner tube defines a hole configured to receive a medium for transmitting signals. Outer beams connect and space apart the inner tubes and the outer tubes. Inner beams connect and space apart the inner tubes. The outer tube, inner tubes, outer beams, and inner beams define hollow passageways which extend through the outer tube.

20 Claims, 10 Drawing Sheets

| MECHANICAL PROPERTIES | METRIC | ENGLISH | COMMENTS |
|---|---|---|---|
| HARDNESS, ROCKWELL M | 55 | 55 | ISO 2039-2 |
| TENSILE STRENGTH AT BREAK | 175 MPa | 25400 psi | 5mm/min; ISO 527 -2/1A |
| TENSILE STRESS | 33.75 MPa | 4895 psi | |
| | @STRAIN 0.310 %, | @STRAIN 0.310 %, | |
| ELONGATION AT BREAK | 0.033 | 0.033 | 5mm/min; ISO 527 -2/1A |
| TENSILE MODULUS | 11.0 GPa | 1600 ksi | 1mm/min; ISO 527 -2/1A |
| FLEXURAL STRENGTH | 210 MPa | 30500 psi | ISO 178 |
| FLEXURAL MODULUS | 10.5 GPa | 1520 ksi | ISO 178 |
| COMPRESSIVE STRENGTH | 77.0 MPa | 11200 psi | ISO 604 |
| | @STRAIN 1.00 % | @STRAIN 1.00 % | |
| COMPRESSIVE MODULUS | 10.5 GPa | 1520 ksi | ISO 604 |
| SHEAR MODULUS | 0.00300 GPa | 0.435 ksi | |
| | @TEMPERATURE 280 Â°C | @TEMPERATURE 536 Â°F | |

| ELECTRICAL PROPERTIES | METRIC | ENGLISH | COMMENTS |
|---|---|---|---|
| VOLUME RESISTIVITY | 1.00e+13 ohm - cm | 1.00e+13 ohm - cm | IEC 60093 |
| SURFACE RESISTANCE | >= 1.00e+15 ohm | >= 1.00e+15 ohm | IEC 60093 |
| DIELECTRIC CONSTANT | 3.1 | 3.1 | IEC 60250 |
| | @FREQUENCY 1.00e+6 Hz | @FREQUENCY 1.00e+6 Hz | |
| | 3.5 | 3.5 | IEC 60250 |
| | @FREQUENCY 100 Hz | @FREQUENCY 100 Hz | 6 |

SECTION B-B
FIG. 7B

SECTION B-B
FIG. 8B

MOLDED INSULATOR

BACKGROUND

1. Field

The present disclosure generally relates to insulated cable connectors and improvements thereof. More particularly, the present disclosure relates to an insulated connector for Quadrax cables that is molded for easier manufacturing.

2. Description of the Related Art

A Quadrax connector is a connector for Quadrax cables. A Quadrax cable is designed for high speed data communication, in the GHz range. Each Quadrax cable includes two pairs of wires. Each pair of wires is designed such that a high speed signal in one wire will have a predictable impedance effect on its mate, located on the other side of the cable. To prevent signal loss, the Quadrax connector cannot change the impedance of the Quadrax cables. Therefore, the structure of and the insulators in the Quadrax connector require specific geometry and materials.

Materials such as Polytetrafluoroethylene (PTFE) or Teflon® are commonly used to fabricate Quadrax connectors. For example, Teflon® has a favorable dielectric constant of about 1.6, which does not lower impedance. However, because of the tight tolerances required and the lack of moldability of Teflon®, machining the Teflon® can be a difficult and expensive process, resulting in an expensive part.

SUMMARY

A molded insulated connector for Quadrax cables. In one implementation, the connector comprises an outer tube having an inner surface. The connector further comprises a first inner tube having a hole and an outer surface and disposed within the outer tube, the hole of the first inner tube configured to receive a first medium for transmitting signals, and a second inner tube having a hole and an outer surface and disposed within the outer tube, the hole of the second inner tube configured to receive a second medium for transmitting signals. A first outer beam is connected between the outer surface of the first inner tube and the inner surface of the outer tube, the first outer beam suspending the first inner tube from the outer tube and preventing the first inner tube from contacting the inner surface of the outer tube. A second outer beam is connected between the outer surface of the second inner tube and the inner surface of the outer tube, the second outer beam suspending the second inner tube from the outer tube and preventing the second inner tube from contacting the inner surface of the outer tube. A first passageway is defined by the inner surface of the outer tube, the first inner tube, the second inner tube, the first outer beam, and the second outer beam, the first passageway extending completely through the outer tube.

BRIEF DESCRIPTION OF THE DRAWINGS

Other systems, methods, features, and advantages of the present disclosure will be or will become apparent to one with skill in the art upon examination of the following figure and detailed description. It is intended that all such additional systems, methods, features, and advantages be included within this description, be within the scope of the present disclosure, and be protected by the accompanying claims. Component parts shown in the drawing are not necessarily to scale, and may be exaggerated to better illustrate the important features of the present disclosure. In the drawing, like reference numerals designate like parts throughout different views, wherein:

DETAILED DESCRIPTION

Figure 1:
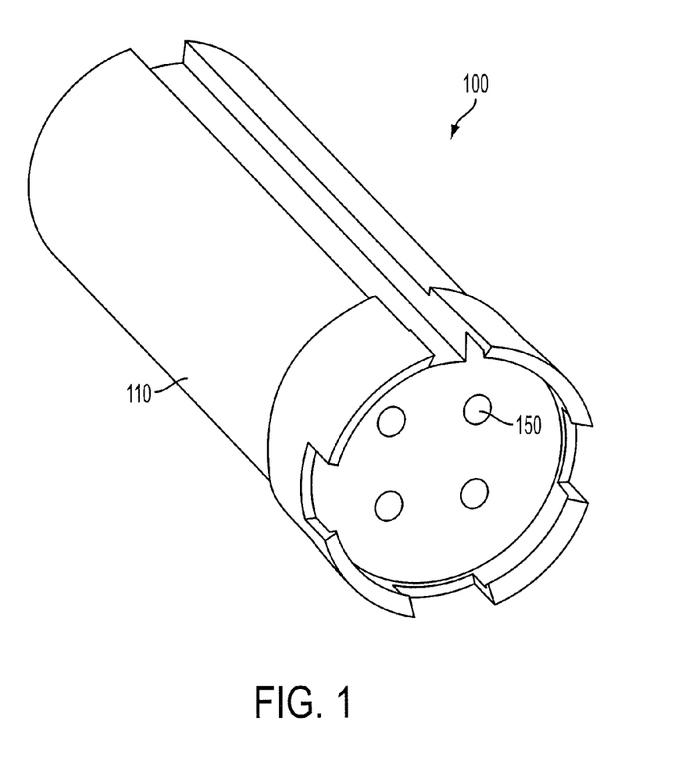
FIG. 1 is an isometric view of a Quadrax connector.

FIG. 1 is an isometric view of a Quadrax connector 100. The connector 100 has a tube 110 as its main body. The tube 110 defines four holes 150. The holes 150 are arranged equidistant from a center axis of the tube 110 in order to receive the four wires of a Quadrax cable. The tube 110 comprises a generally solid (i.e. filled-in) structure, having only the four holes 150 as void or empty regions. The tube 110 may be made from a material, such as PTFE or Teflon®, having a low dielectric constant such that the impedances from the electrical signals transmitted through the Quadrax cable are not affected.

Although materials such as PTFE or Teflon® have favorable dielectric constants, the materials require costly machining to meet the tight geometric tolerances required for Quadrax connectors. Injection molding provides a less costly manufacturing alternative capable of meeting the tight tolerances. However, materials such as PTFE or Teflon® are not conducive to molding. Injection moldable materials, such as a liquid crystal polymer (LCP), a Vectra compound, or other thermoplastics are more easily molded, but have a higher dielectric constant on the order of 3.0 to 4.5 compared to Teflon® at 1.6. The high dielectric constant unfavorably lowers the impedances of the electrical signals.

Figure 2:
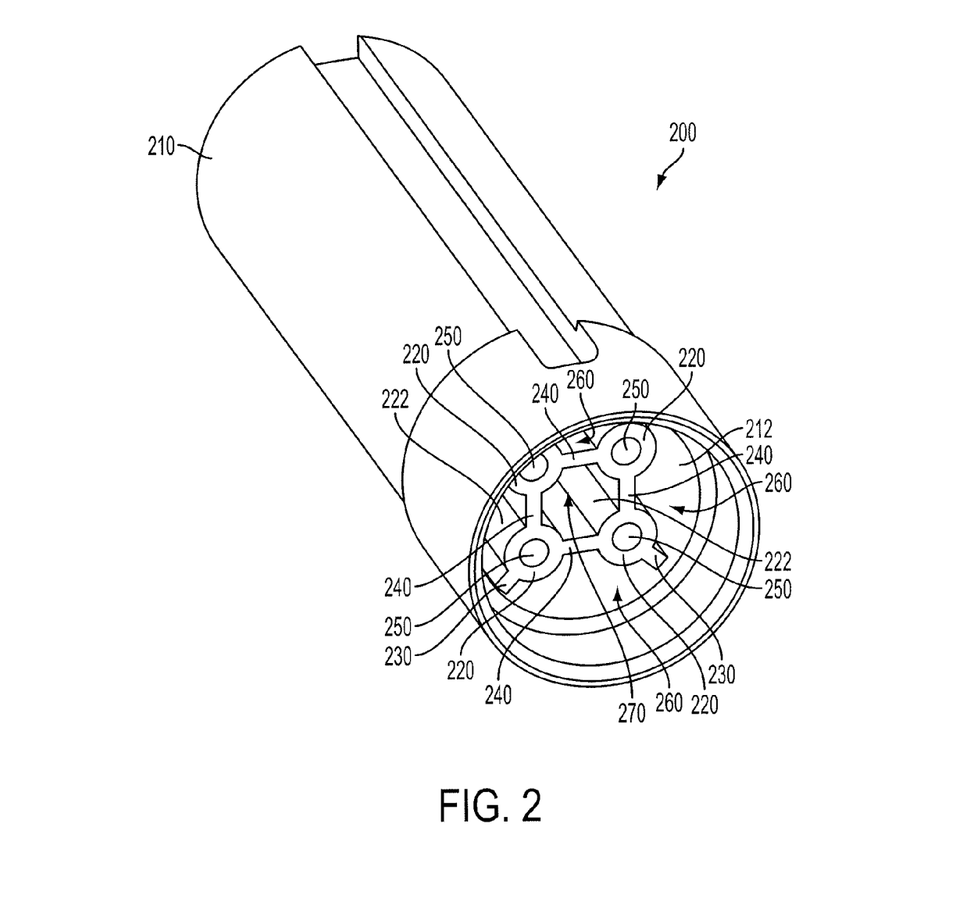
FIG. 2 is an isometric view of a connector according to an implementation of the present disclosure.

To lower the dielectric constant, portions of the connector may be replaced by another material having a lower dielectric constant. For example, portions of the connector may be replaced by air, having a dielectric constant near 1. In other words, hollowing out the connector may lower its dielectric constant. However, the connector must be hollowed such that the dielectric constant is lowered enough to not substantially affect impedance, while maintaining structural integrity. FIG. 2 illustrates one suitable design of a connector 200 having hollowed out portions or voids.

The connector 200 has a main body comprising an outer tube 210. The outer tube 210 has an inner surface 212, which generally defines a cavity such that the outer tube 210 is essentially a hollow tube. A completely hollow tube would lack holes, such as holes 150 in FIG. 1, for receiving wires, pins, or terminals such as the four wires of a Quadrax cable. One or more inner tube 220 define a hole 250. The inner tube 220 is generally a hollow tube having a smaller radius than the outer tube 210, but a similar length. The hollow portion of the inner tube 220 defines the hole 250 for receiving wires, pins, or terminals of a cable or other connecting mechanism. In FIG. 2, four inner tubes 220 are arranged to receive a Quadrax cable, although in other implementations a greater or lesser number of inner tubes 220 may be used to receive other types of cables. For example, two, three, four, five, six, seven and eight inner tubes 220 may be used.

The inner tube 220 includes an outer surface 222. An outer beam 230 connects the outer surface 222 of the inner tube 220 to the inner surface 212 of the outer tube 210. The outer beam 230 spaces apart the inner tube 220 from the outer tube 210 so that the inner tube 220 is not in physical contact with the outer tube 210. The outer beam 230 further serves as a support structure for the inner tube 220 in order to hold the inner tube 220 at a specific location with respect to the outer tube 210. In addition, the outer beam 230 generally runs the length of the inner tube 220 to provide support. The length of the outer beam 230 further provides uniformity such that the dielectric properties of the connector 200 do not vary throughout its length.

An inner beam 240 connects the outer surface 222 of one inner tube 220 to the outer surface 222 of an adjacent inner tube 220. The inner beam 240 provides structural support to better hold the inner tubes 220 in place. The inner beam 240 further spaces apart the inner tubes 220 such that they are not in physical contact with each other.

Because the inner tubes 220 are suspended or spaced apart from the outer tube 210, there are hollowed out or void portions within the connector 200. The outer tube 210, the outer beams 230, the inner tubes 220, and the inner beam 240 define at least one passageway 260. In FIG. 2, due to the Quadrax layout (e.g., four sets of inner tubes 220), four passageways 260 are defined around the inner tubes 220. Moreover, the inner tubes 220 and the inner beams 240 define a center passageway 270 extending through the center of the outer tube 210. In one implementation, the outer tube 210, the inner tubes 220, the outer beams 230, and the inner beams 240 may be made from a single continuous piece of material. The passageways 260 and the center passageway 270 substantially run the entire length of the connector 200. Because the passageways 260 and the center passageway 270 is hollow (i.e., filled with air), the dielectric constant of the connector 200 is lowered.

Because the connector 200 may be made from an injection molding process, the connector 200 may form a single continuous piece. In other words, the passageways 260, the center passageway 270, and the holes 150 are not removed from a solid piece of material, which allows for precision manufacturing without complex fabrication.

Figure 3:
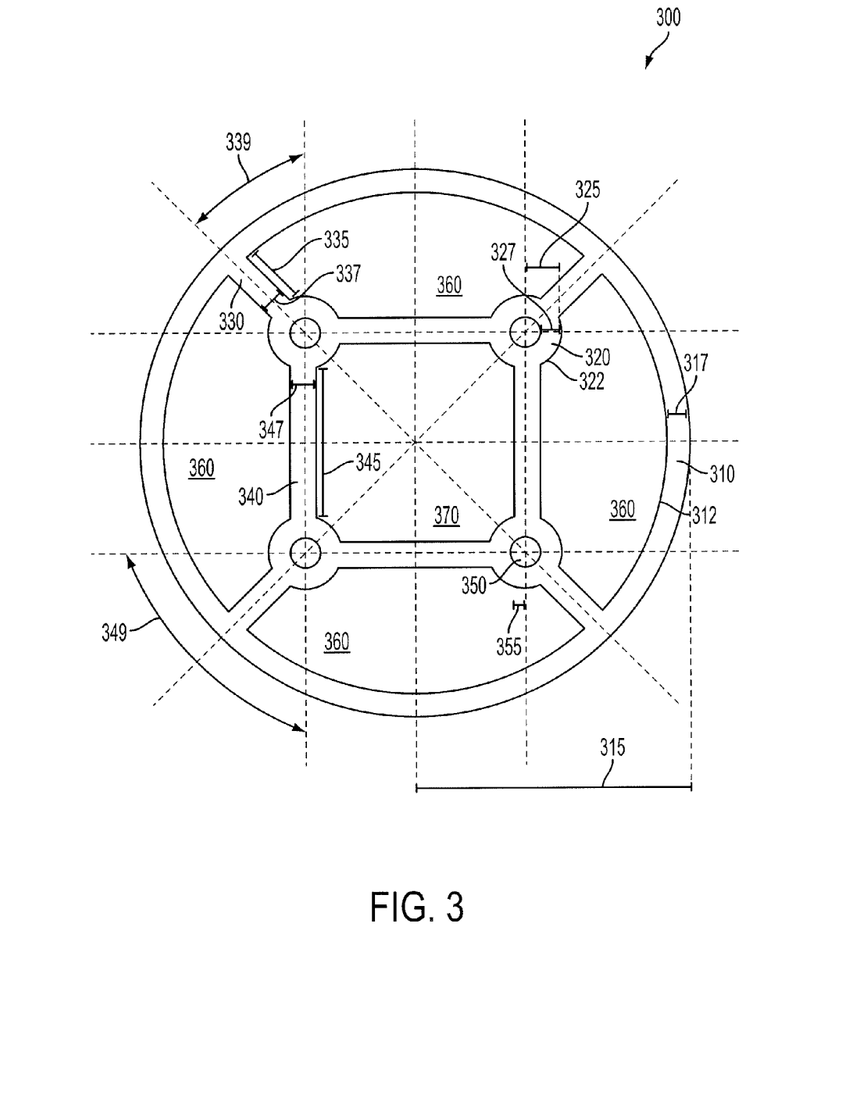
FIG. 3 is a cross-sectional front view of the connector according to an implementation of the present disclosure.

The hollowed portions are designed to lower the dielectric constant without sacrificing structural strength. FIG. 3 depicts a front or face view of a connector 300, which may correspond to the connector 200. Similar to the connector 200, the connector 300 comprises an outer tube 310, one or more inner tubes 320, one or more outer beams 330, and one or more inner beams 340. All dimensions described in the present disclosure are exemplary and in other implementations may vary based on the application.

The outer tube 310 has an inner surface 312. A radius 315 of the outer tube 310 defines the size of the outer tube 310. The radius 315 may be about 3 mm, but in other implementations may range from about 2 mm to about 6 mm. The outer tube 310 also has a thickness 317, which can also be defined from an inner radius. The thickness 317 may range from about 0.011 inches to about 0.022 inches.

The inner tube 320 has an outer surface 322. The inner tube 320 has a radius 325 smaller than the radius 315 of the outer tube 310. The radius 325 of the inner tube 320 may be about 0.3 mm, or may range from about 0.2 mm to about 0.5 mm in other implementations. The inner tube 320 also has a thickness 327, which may range from about 0.011 inches to about 0.022 inches.

The outer beam 330 has a length 335, which may be about 0.6 mm. In other implementations, the length 335 may be about 0.1 mm to about 1.0 mm. The outer beam 330 also has a thickness 337, which may range from about 0.011 to about 0.022 inches. The outer beam 330 forms an angle 339 with an axis parallel to the inner beam 340. In FIG. 3, the angle 339 may be about 45 degrees, although in other implementations, the angle 339 may vary as needed. For example, the angle 339 may range from about 30 degrees to about 60 degrees.

The inner beam 340 has a length 345 of about 0.8 mm. In other implementations, the length 345 may vary from about 0.6 mm to about 1.2 mm. The inner beam 340 further has a thickness 347 of about 0.011 inches to about 0.022 inches. The inner beams 340 form an angle 349, which may be about 90 degrees, although may vary in other implementations.

A hole 350 is defined by each inner tube 320. The hole 350 has a radius 355 configured to accept a wire, pin, or terminal, such as a Quadrax cable. In other implementations, the radius 355 may correspond to other cable wire sizes, ranging from about 0.028 inches to about 0.033 inches.

FIG. 3 depicts a connector for a Quadrax cable, which requires four holes 350. The holes 350 are disposed generally symmetrically around the center of the outer tube 310, corresponding to the wire locations of a Quadrax cable. The four inner tubes 320, which define the four holes 350, form the vertices of a substantially square shape, held together by four inner beams 340. This square shape is spaced apart from the outer tube 310 by four outer beams 330. The outer beams 330 generally flare out symmetrically from the square shape. The voids between the outer beams 330 form four passageways 360. The void between the inner beams 340 forms a center passageway 370.

Because the passageways 360 and the center passageway 370 are defined by the outer beams 330, the inner beams 340, and the inner tubes 320, the passageways 360 and the center passageway 370 may vary in size, shape, and number depending on the layout and the dimensions (i.e., radii 315, 325 and 355, lengths 335 and 345, thicknesses 317, 327, 337 and 347) of the outer beams 330, the inner beams 340, and the inner tubes 320. For instance, more or less inner beams 340 may be used. The inner tubes 320 may be supported by only respective outer beams 330, such that there may or may not be inner beams 340 connecting the inner tubes 320. The center passageway 370 may connect with a passageway 360 to form a larger passageway 360. Alternatively, the inner beams 340 may diagonally connect non-adjacent inner tubes 320, which would partition the center passageway 370. In yet other implementations, additional inner beams 340 may connect other components, such as connecting the outer beams 330 and/or the inner tubes 320.

In addition, more or less outer beams 330 may be used. For example, the inner beams 340 may provide enough support between the inner tubes 320 such that not all inner tubes 320 require its own respective outer beam 330 for support. The passageways 360 may combine into a larger passageway 360. Alternatively, more than one outer beam 330 per inner tube 320 would partition the passageways 360. The outer beams 330 may also be used to connect other components, such as inner beams 340, to the outer tube 310.

By adding voids, a moldable material such as Ticona LCP A435 (a Vectra® compound) can be used despite its high dielectric constant. Since the voids are essentially filled with air, having a low dielectric constant, the overall dielectric constant of the connector 300 is lowered. In other implementations, other moldable materials may be used. Depending on the dielectric constant of the moldable material, the passageway 360 and/or the center passageway 370 may be expanded or reduced.

The various dimensions may be determined through calculation and simulations. Depending on the specific application parameters, more or less material may be removed from the design and tested through computer simulation until the desired parameters are met. For example, the design may be based on matching a specific impedance and achieving a specific dimensional fit.

Figure 4:
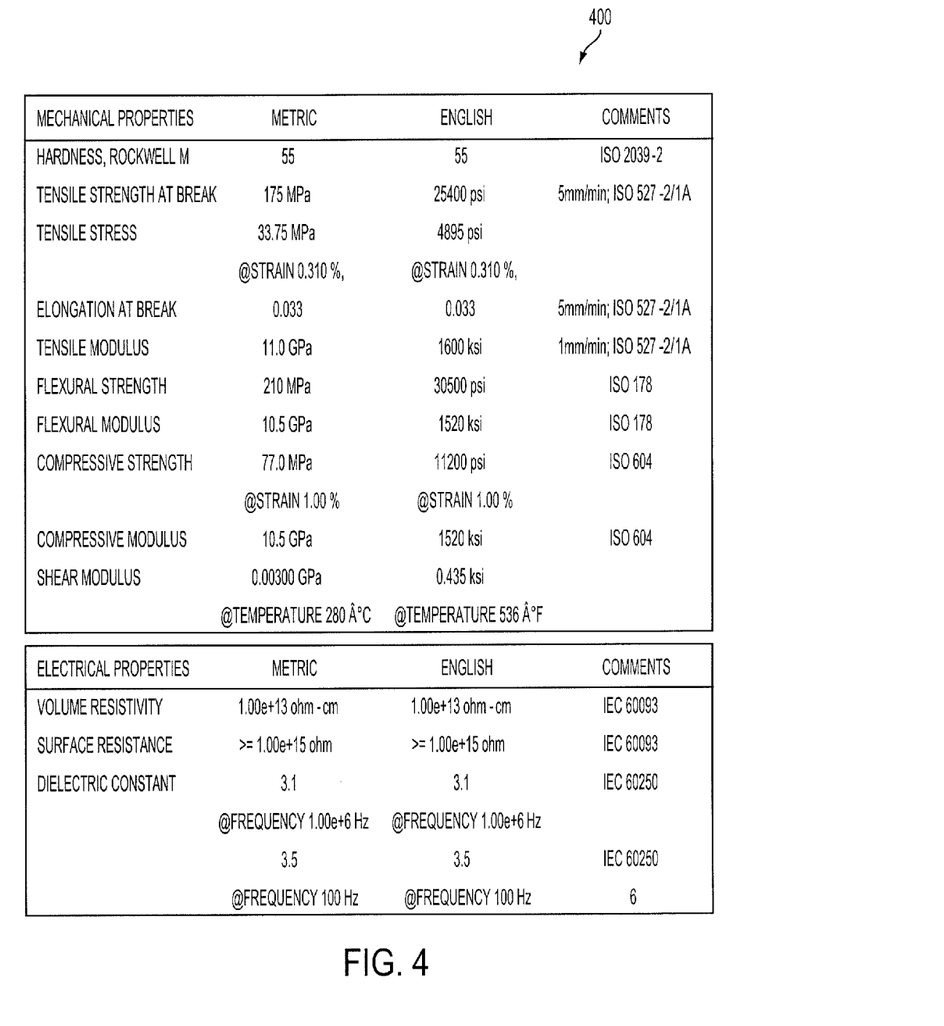
FIG. 4 is a table of material properties for the connector.

FIG. 4 presents a table 400 showing the mechanical and electrical properties of a Liquid Crystal Polymer (LCP). LCP has a softening temperature of 280 degrees Celsius, which is suitable for withstanding operating temperatures in various applications. Although LCP is mechanically suitable for the connectors 200 and/or 300, its normal dielectric constant of 3.1 to 3.5 is too high. However, because of LCP's mechanical properties, the molded connector may be hollowed to lower the dielectric constant without sacrificing structural integrity.

Figure 5:
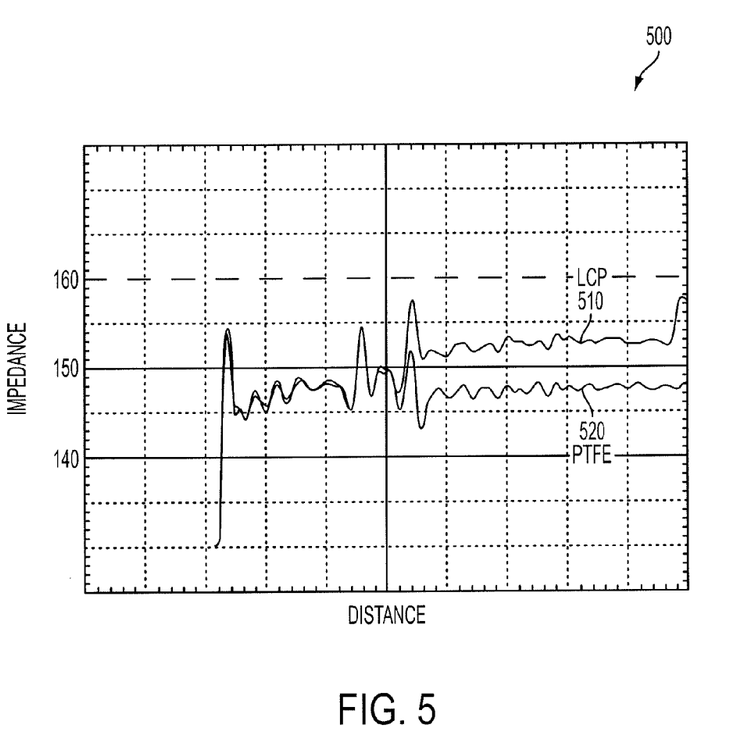
FIG. 5 is a graph comparing performance results of two different materials used to construct the connector.

FIG. 5 shows a graph 500 comparing performance results of PTFE versus LCP. The x-axis shows distance along a connector. The y-axis shows impedance values in ohms. An LCP curve 510 shows the impedance values measured along a connector made of LCP, such as the connector 200. The LCP curve 510 is overlaid a PTFE curve 520, which shows the impedance values measured along a connector made of PTFE, such as the connector 100. As seen in FIG. 5, the LCP curve 510 generally resembles the PTFE curve 520. The mirroring curves indicate that the connector 200 performs similar to the connector 100.

Figure 6:
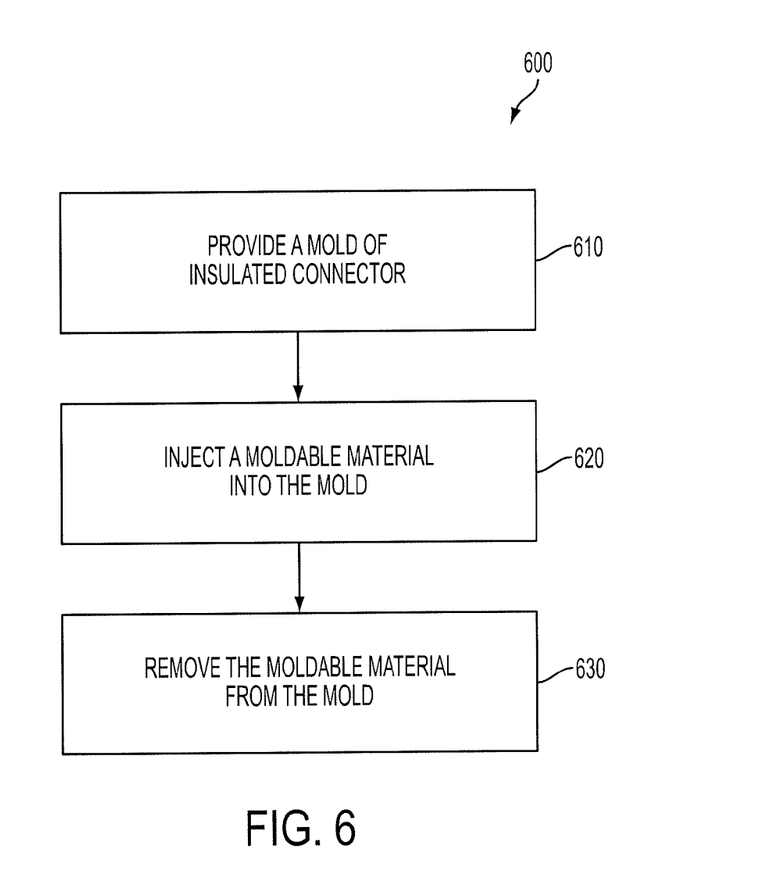
FIG. 6 is a flowchart of a manufacturing process for the connector according to an implementation of the present disclosure.

FIG. 6 presents a flowchart 600 of a fabrication process. At 610, a mold of the insulated connector is provided. The mold may be selected or designed based on the material to be used, and ensuring sufficient mechanical strength and a low dielectric constant. For example, the mold may be a mold of the connector 200. The mold may be made of metal or other material suitable for injection molding.

At 620, a moldable material is injected into the mold. LCP may be used, but in other implementations other moldable materials may be used. The material may first be heated and mixed in a barrel and shot at a high pressure and velocity into a cavity of the mold. At 630, the moldable material is removed from the mold. Additional steps, such as a hardening or curing step, may further prepare the moldable material before removal from the mold. Moreover, quality assurance may be performed, such as checking the tolerances of the holes, after the moldable material is removed.

Figure 7A:
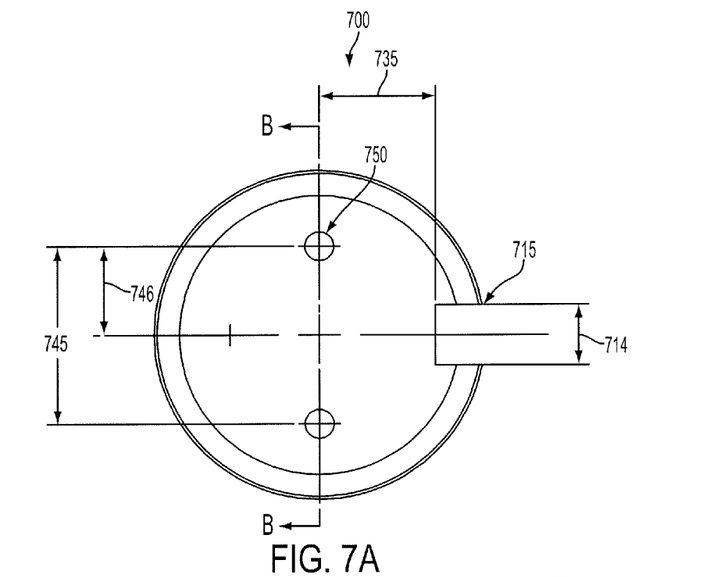
FIG. 7A is a front view of a connector according to an implementation of the present disclosure.
Figure 7B:
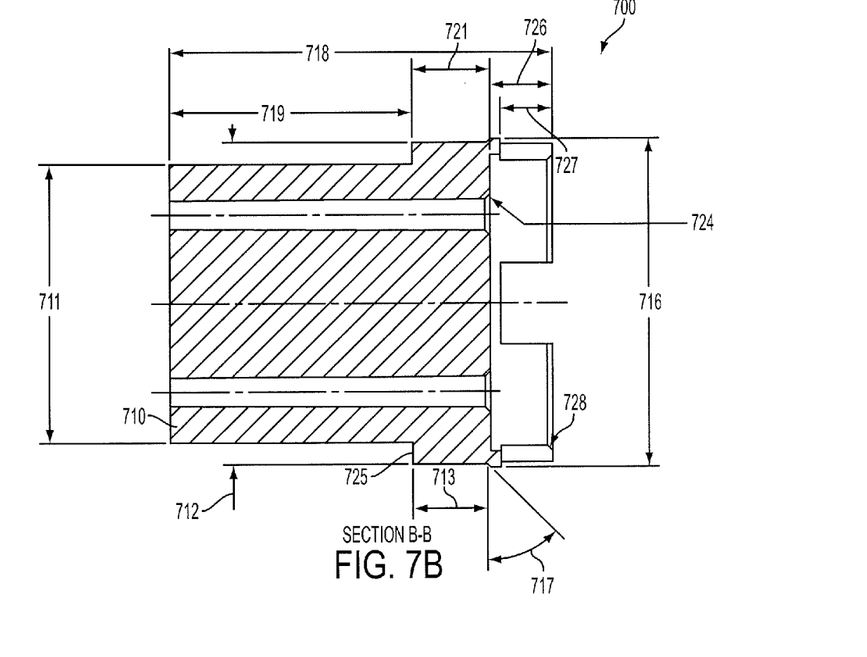
FIG. 7B is a side view of the connector of FIG. 7A according to an implementation of the present disclosure.

FIGS. 7A and 7B present a connector 700 having two holes 750 arranged in a Twinax configuration. FIG. 7B illustrates a cross-section of the connector 700 along the B-B axis. The connector 700 comprises a tube 710 having a notch 715. The notch 715 has a length 714 of around 0.059+/−0.001 inches.

The notch 715 ends at a distance 735 apart from a center of the connector 700, which may be around 0.114+/−0.001 inches. The holes 750 may be a distance 746 apart from the center of the connector 700, which may be around 0.087+/−0.003 inches. The holes 750 are a distance 745 apart, which may be around 0.174+/−0.003 inches. The holes 750 may have a radius of around 0.0290+/−0.0025 inches.

In FIG. 7B, the tube 710 has a height 711, which may be around 0.273+/−0.001 inches, and a total length 718, which may be around 0.372 inches. A ridge 725 extends a thickness 712, around 0.316+/−0.001 inches, from the tube 710. The ridge 725 has a length 721 of around 0.76+0.001 to −0.002 inches, leaving a sub-length 719 of the tube 710 at around 0.236+/−0.001 inches. The ridge 725 has a sub-length 713 of around 0.73+/−0.002 inches, leading to a notch 717 at an angle of around 45+/−2 degrees. A ridge extension 726 has a length of around 0.060+0.001 to −0.002 inches, extending a sub-length 727 of around 0.050 inches from the ridge 725. The ridge extension 726 has a height 716 of around 0.322+/−0.001 inches. The holes 750 have a slope 724 of approximately 45+/−2 degrees, extending about 0.005+/−0.002 inches into the tube 710. The ridge extension 726 has an edge slope 728 of approximately 45+/−2 degrees, extending about 0.005+/−0.002 inches.

Figure 7C:
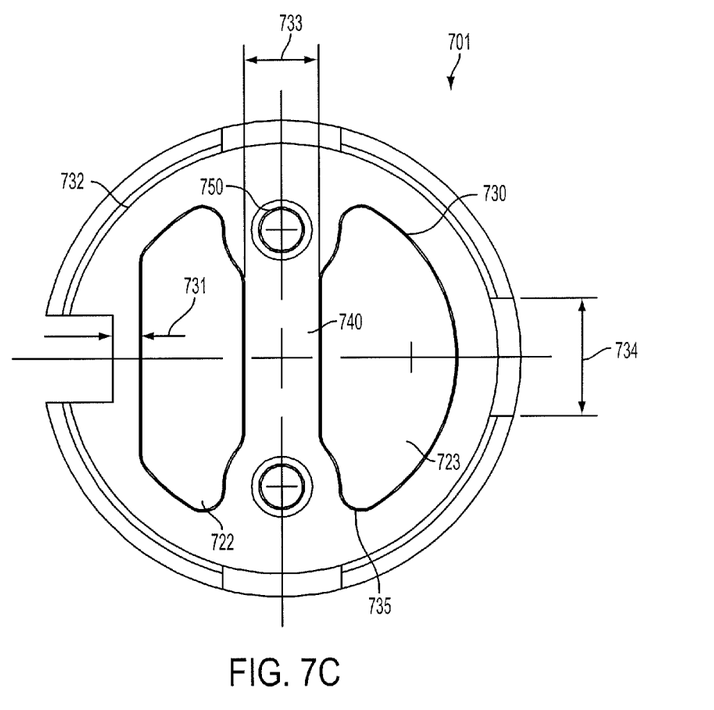
FIG. 7C is a front view of a connector according to an implementation of the present disclosure.
Figure 7D:
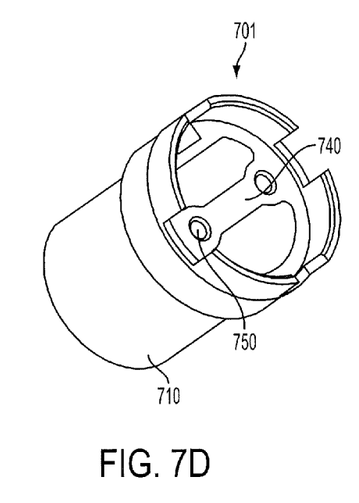
FIG. 7D is another view of the connector of FIG. 7C according to an implementation of the present disclosure.
Figure 7E:
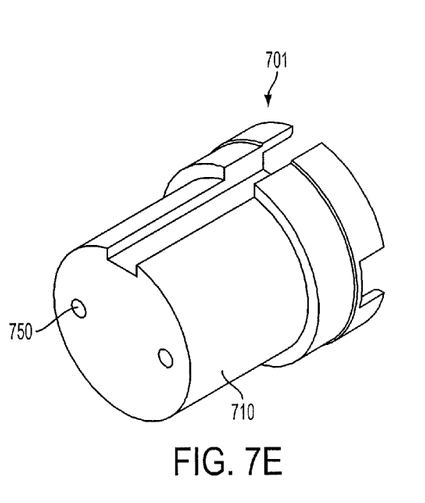
FIG. 7E is another view of the connector of FIG. 7C according to an implementation of the present disclosure.

FIGS. 7C-E show a connector 701, which may be similar to the connector 700 (e.g. sharing similar dimensions), but further hollowed out by a first passageway 722 and a second passageway 723. The holes 750 may have a radius of about 0.007 inches. An inner beam 740 has a thickness 733 of about 0.050 inches. A notch 714 near the first passageway 722 defines a thickness 731 of about 0.018 inches. A slot 734 has a height of about 0.080 inches. An inner radius 735 of the first passageway 722 and the second passageway 723 may be around 0.015 inches and an outer radius 730 of the second passageway 723 may be about 0.119 inches. An inner ridge 732 has a dimension of about 0.291+/−0.001 inches.

Figure 8A:
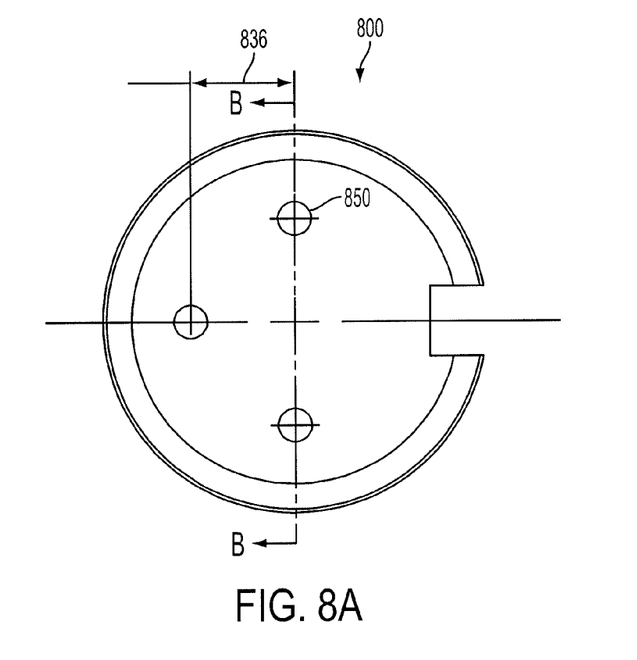
FIG. 8A is a front view of a connector according to an implementation of the present disclosure.
Figure 8B:
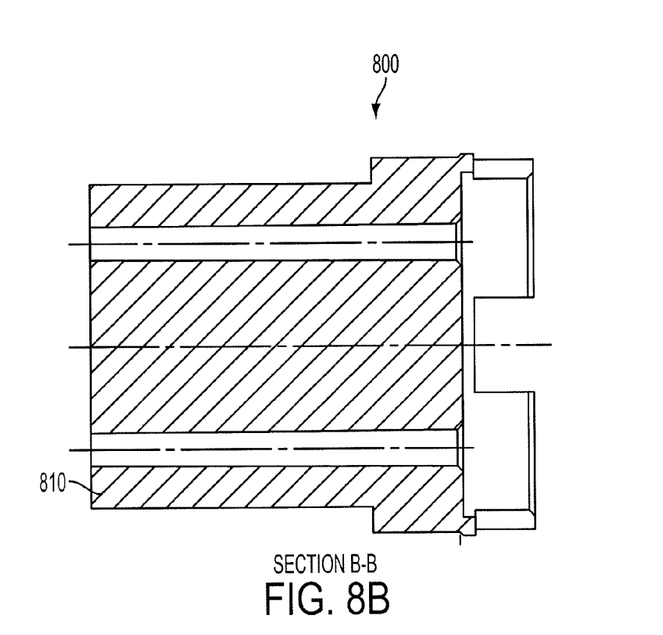
FIG. 8B is a side view of the connector of FIG. 8A according to an implementation of the present disclosure.

FIGS. 8A and 8B present a connector 800 comprising a tube 810 having three holes 850. FIG. 8B illustrates a cross-section of the connector 800 along the B-B axis. The dimensions of the connector 800 may be similar to those of the connector 700, described above. The third hole 850 may be a distance 836 apart from the axis between the other two holes 850, which may be about 0.087 inches.

Figure 8C:
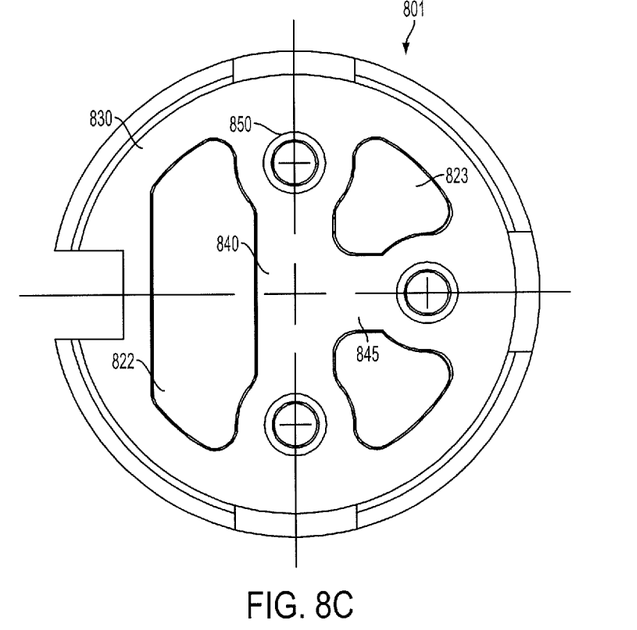
FIG. 8C is a front view of a connector according to an implementation of the present disclosure.
Figure 8D:
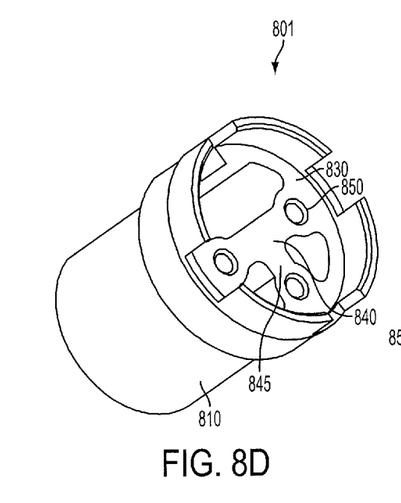
FIG. 8D is another view of the connector of FIG. 8C according to an implementation of the present disclosure.
Figure 8E:
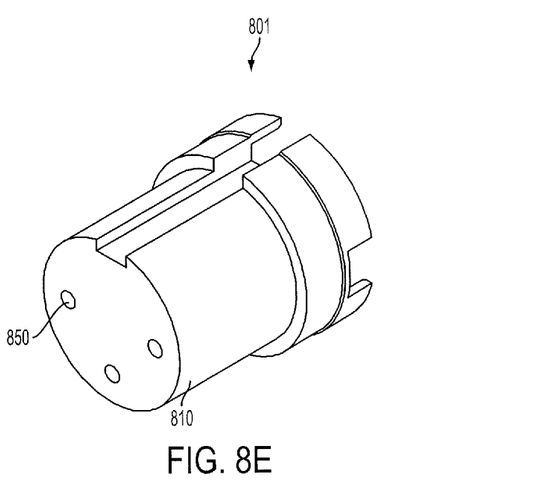
FIG. 8E is another view of the connector of FIG. 8C according to an implementation of the present disclosure.

FIGS. 8C-E show a connector 801, which may be similar to the connector 800 (e.g. sharing similar dimensions), but further hollowed out by a first passageway 822, and two second passageways 823. Similar to the connector 701, the connector 801 has an inner beam 840. However, due to the third hole 850, the connector 801 further includes a second inner beam 845. The first passageway 822 and the second passageways 823 do not extend to the edges of the tube 810, leaving a ring 830 around the features of the connector 801 for added structural support.

Exemplary implementations of the present disclosure have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such implementations that reasonably fall within the scope of the advancement to the art hereby contributed, and that that scope shall not be restricted, except in light of the appended claims and their equivalents.

What is claimed is:

1. A connector comprising:
   an outer tube having an inner surface;

a first inner tube having a hole and an outer surface and disposed within the outer tube, the hole of the first inner tube configured to receive a first medium for transmitting signals;

a second inner tube having a hole and an outer surface and disposed within the outer tube, the hole of the second inner tube configured to receive a second medium for transmitting signals;

a first outer beam connected between the outer surface of the first inner tube and the inner surface of the outer tube and substantially extending along a length of the first inner tube, the first outer beam suspending the first inner tube from the outer tube and preventing the first inner tube from contacting the inner surface of the outer tube;

a second outer beam connected between the outer surface of the second inner tube and the inner surface of the outer tube and substantially extending along a length of the second inner tube, the second outer beam suspending the second inner tube from the outer tube and preventing the second inner tube from contacting the inner surface of the outer tube; and a first passageway defined by the inner surface of the outer tube, the first inner tube, the second inner tube, the first outer beam, and the second outer beam, the first passageway extending completely through the outer tube.

2. The connector of claim 1, wherein the first and second mediums comprise pins for a Twinax cable.

3. The connector of claim 1, further comprising a first inner beam connected between the first inner tube and the second inner tube, the first inner beam connecting the first inner tube to the second inner tube, wherein the first passageway is further defined by the first inner beam.

4. The connector of claim 3, wherein the outer tube, the first and second inner tubes, the first and second outer beams, and the first inner beam comprise a single continuous piece.

5. The connector of claim 4, wherein the single continuous piece is made of injection moldable material.

6. The connector of claim 4, wherein the single continuous piece is made of liquid crystal polymer (LCP).

7. The connector of claim 3, further comprising:
a third inner tube having a hole and an outer surface and disposed within the outer tube, the hole of the third inner tube configured to receive a third medium for transmitting signals;
a fourth inner tube having a hole and an outer surface and disposed within the outer tube, the hole of the fourth inner tube configured to receive a fourth medium for transmitting signals;
a third outer beam connected between the outer surface of the third inner tube and the inner surface of the outer tube, the third outer beam suspending the third inner tube from the outer tube and preventing the third inner tube from contacting the inner surface of the outer tube;
a fourth outer beam connected between the outer surface of the fourth inner tube and the inner surface of the outer tube, the fourth outer beam suspending the fourth inner tube from the outer tube and preventing the fourth inner tube from contacting the inner surface of the outer tube;
a second inner beam connected between the third inner tube and the fourth inner tube, the second inner beam connecting the third inner tube to the fourth inner tube;
a third inner beam connected between the first inner tube and the third inner tube, the third inner beam connecting the first inner tube to the third inner tube;
a fourth inner beam connected between the second inner tube and the fourth inner tube, the fourth inner beam connecting the second inner tube to the fourth inner tube;
a second passageway defined by the inner surface of the outer tube, the third inner tube, the fourth inner tube, the third outer beam, the fourth outer beam, and the second inner beam, the second passageway extending completely through the outer tube;
a third passageway defined by the inner surface of the outer tube, the first inner tube, the third inner tube, the first outer beam, the third outer beam, and the third inner beam, the third passageway extending completely through the outer tube;
a fourth passageway defined by the inner surface of the outer tube, the second inner tube, the fourth inner tube, the second outer beam, the fourth outer beam, and the fourth inner beam, the fourth passageway extending completely through the outer tube; and
a center passageway defined by the first, second, third and fourth inner tubes and the first, second, third and fourth inner beams, the center passageway extending completely through the outer tube.

8. The connector of claim 7, wherein the first, second, third and fourth mediums comprise pins for a Quadrax cable.

9. The connector of claim 7, wherein the outer tube, the first, second, third and fourth inner tubes, the first, second, third and fourth outer beams, and the first, second, third and fourth inner beams comprise a single continuous piece.

10. The connector of claim 9, wherein the single continuous piece is made of injection moldable material.

11. The connector of claim 9, wherein the single continuous piece is made of liquid crystal polymer (LCP).

12. The connector of claim 9, wherein the single continuous piece is made from injection molding.

13. An insulated connector having a longitudinal axis comprising:
a body having an outer tube and defining at least one pair of holes extending longitudinally through the body, the body defining a center passageway radially inward from the at least one pair of holes and substantially extending along a length of the at least one pair of holes, and an outer passageway between the outer tube and the at least one pair of holes such that the outer passageway is positioned radially outward from the center passageway, the outer passageway substantially extending along a length of the center passageway; and
a face for receiving a cable, the face exposing the at least one pair of holes.

14. The insulated connector of claim 13, wherein the at least one pair of holes is configured to receive at least one pair of pins of the cable.

15. The insulated connector of claim 13, wherein the body and the face comprise a single continuous piece.

16. The insulated connector of claim 15, wherein the body further includes at least one pair of inner tubes each defining a hole of the at least one pair of holes and an outer beam connected between an inner tube of the at least one pair of inner tubes and the outer tube, the outer beam substantially extending along a length of the inner tube.

17. The insulated connector of claim 15, wherein the single continuous piece is made of a liquid crystal polymer (LCP).

18. A method of manufacturing an insulated connector comprising:
providing a mold for the insulated connector comprising:
a body having a longitudinal axis and an outer tube and defining at least one pair of holes extending longitudinally through the body, the body defining a center passageway radially inward from the at least one pair of holes and substantially extending along a length of the at least one pair of holes, and an outer passageway between the outer tube and the at least one pair of holes such that the outer passageway is positioned radially outward from the center passageway, the outer passageway substantially extending along a length of the center passageway, a face for receiving a cable, the face exposing the at least one pair of holes;

injecting a moldable material into the mold; and removing the moldable material from the mold.

19. The method of claim 18, wherein the moldable material comprises a liquid crystal polymer (LCP).

20. The method of claim 18, wherein the body further includes at least one pair of inner tubes each defining a hole of the at least one pair of holes and an outer beam connected between an inner tube of the at least one pair of inner tubes and the outer tube, the outer beam substantially extending along a length of the inner tube.

\* \* \* \* \*